United States Patent
Kästle

(10) Patent No.: US 6,654,623 B1
(45) Date of Patent: Nov. 25, 2003

(54) INTERFERENCE SUPPRESSION FOR MEASURING SIGNALS WITH PERIODIC WANTED SIGNALS

(75) Inventor: Siegfried Kästle, Nufringen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/018,068

(22) PCT Filed: Jun. 10, 1999

(86) PCT No.: PCT/EP99/03996

§ 371 (c)(1),
(2), (4) Date: May 29, 2002

(87) PCT Pub. No.: WO00/77675

PCT Pub. Date: Dec. 21, 2000

(51) Int. Cl.$^7$ .................................................. A61B 5/00
(52) U.S. Cl. ........................ 600/336; 600/323; 702/19
(58) Field of Search ................................ 600/300, 309, 600/310, 322, 323, 330, 336, 481, 508, 529; 702/19; 708/400

(56) References Cited

U.S. PATENT DOCUMENTS

| | | | | |
|---|---|---|---|---|
| 5,619,998 A | * | 4/1997 | Abdel-Malek et al. ....... | 600/437 |
| 5,778,881 A | * | 7/1998 | Sun et al. .................... | 600/509 |
| 5,781,881 A | * | 7/1998 | Stegmann .................... | 704/211 |
| 6,119,026 A | * | 9/2000 | McNulty et al. ............ | 600/310 |

FOREIGN PATENT DOCUMENTS

EP   0 816 863 A   *   1/1998

OTHER PUBLICATIONS

Bruce et al., "Wavelet Analysis," IEEE Spectrum, Oct. 1, 1996, vol. 33, No. 10, pp. 26–35.*
Neville et al., "Wavelet de–noising of coarsely quantized signals," IEEE Symposium on Advances in Digital Filtering and Signal Processing, Jun. 5–6, 1998, pp. 174–177.*

* cited by examiner

Primary Examiner—Eric F. Winakur
(74) Attorney, Agent, or Firm—John Vodopia

(57) ABSTRACT

The invention relates to a method for suppressing the interferences in a measuring signal with a substantially periodic wanted signal. According to the method, first a transformation, preferably a wavelet transformation, of the measuring signal to a summation of aperiodic basic logic functions is carried out, wherein each element of the sum has a coefficient. Those coefficients that exceed a predetermined threshold value are characterized as interference coefficients that are presumably influenced by interferences and the interference coefficients are manipulated to suppress the interferences. The manipulated summation is then retransformed to an interference-suppressed measuring signal. An undisturbed base signal is shown as curve 300 (thin) and the disturbed signal as curve 310 (extra-bold). The curve 320 (bold) shows the signal screened according to the invention, by starting from curve 310 and carrying out the embodiment presented in the invention.

14 Claims, 12 Drawing Sheets

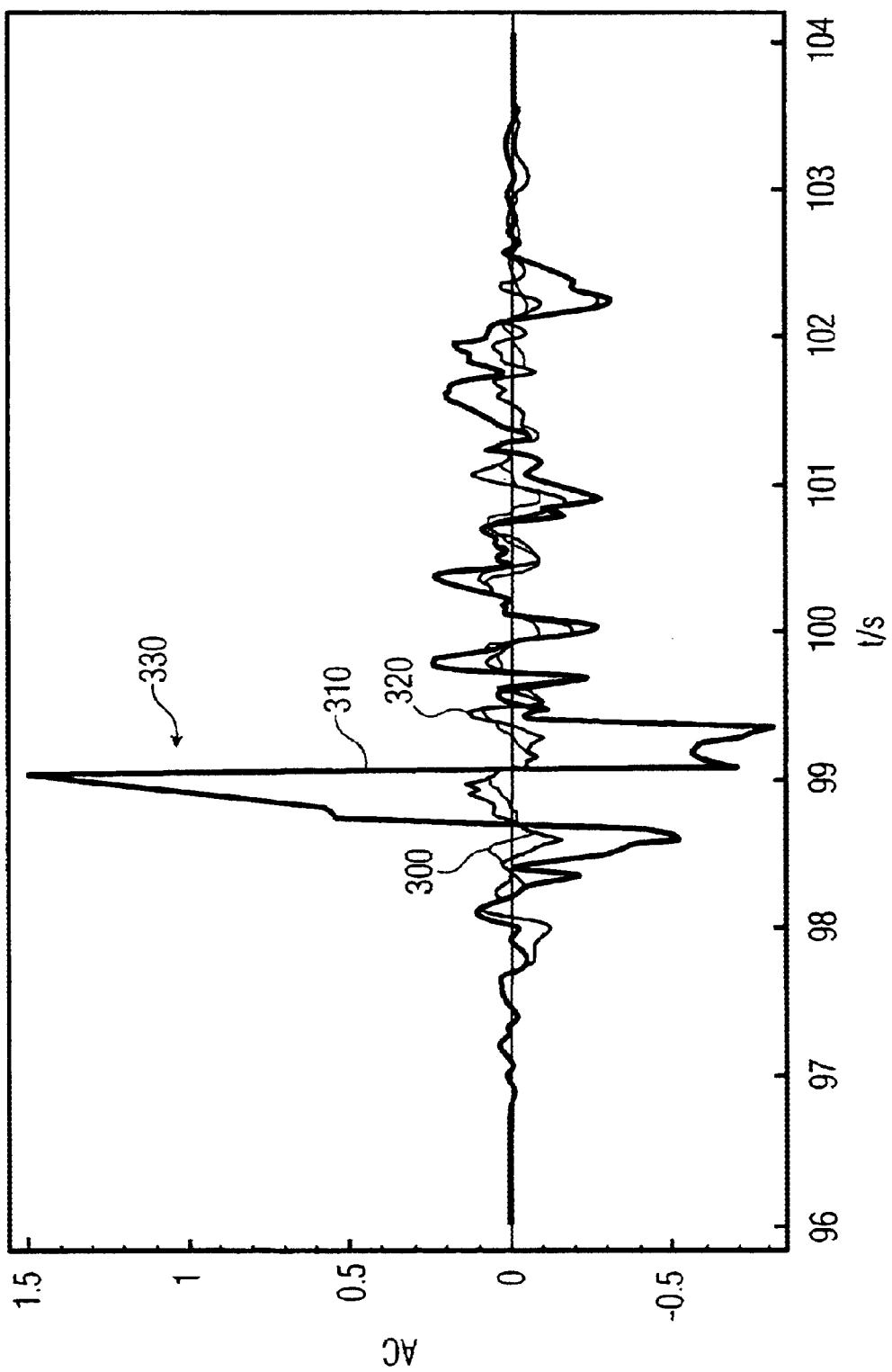

INTERFERENCE SUPPRESSION FOR MEASURING SIGNALS WITH PERIODIC WANTED SIGNALS

BACKGROUND OF THE INVENTION

The invention relates to the suppression of superimposed interferences in a measurement signal with a substantially periodic useful signal.

The measurement of signals may roughly be subdivided in general into a) the recognition of individual, more or less singular events and b) the monitoring of more or less frequently repetitive, substantially periodic signals. In either case, superimposed interferences limit the reliability of the measurement, and the object is to avoid, to suppress, or to filter out these interferences.

For the purposes of the present document, periodic signals should be understood to be those signals for which the useful signal has at least a periodic component, at least over a given domain of time, the frequency of which may indeed be time-dependent.

The recognition of the useful signal and the suppression of interferences is essential in particular in the field of medical patient monitoring, because interferences may lead to a false interpretation of the measurement values, or may render the measurement wholly useless.

A measurement which was found to be particularly sensitive to interfering influences is the pulsoximetrical determination of the oxygen content of the blood, because pulsoximetry is much more strongly influenced by movement artifacts than by the pulse signal determining the blood oxygen. Pulsoximetry involves the non-invasive, continuous determination of the oxygen content of the blood (oximetry), based on an analysis of the photospectrometrically measured pulse. It is necessary for this that a pulse curve (plethysmogram) is available at several wavelengths. In practice, almost all appliances operate with only two wavelengths, which renders it possible to achieve inexpensive, compact solutions. The principle of photometry is based on the fact that the quantity of absorbed light is determined by the degree of absorption of a substance and by the wavelength. Pulsoximeters utilize this effect in that the arterial blood volume, and exclusively the arterial blood volume, pulsates in the rhythm of the heartbeat. If a conclusion is to be drawn as to the value of the oxygen saturation from the obtained measurement data, a ratio of values is derived from the measurement data, which ratio then represents the oxygen saturation value. The basics and application possibilities of pulsoximetry are generally known and have frequently been described, in particular in EP-A-262778 (with a good summary of the theory), U.S. Pat. No. 4,167,331, or by Kästle et al. in "A New Family of Sensors for Pulsoximetry", Hewlett-Packard Journal, vol. 48, no. 1, pp. 39–53, Feb. 1997

Methods proposed for recognizing and suppressing artifacts in pulsoximetrical measurements are in particular processes in the time domain, adaptive filters, spectral analyses, and methods in the time-frequency domain.

Among the methods in the time domain is the peak method, in which the basic signal is subdivided into the individual pulses, and the ratio value is determined from the extreme values of a pulse (cf. EP-A-102816 or U.S. Pat. No. 5,349,519). The essence of this artifact suppression is the comparison of properties such as amplitude, time between maximum and minimum, length, etc., of an identified pulse with those of a reference pulse which was derived from preceding pulses. A further method in the time domain is the ECG synchronization as described in U.S. Pat. No. 4,802,486. A temporal reference to the peripheral pulse is obtained here, derived from the R-spike in the ECG. In the split-wave method (cf. U.S. Pat. No. 5,386,026), the basic signal is scanned at equidistant intervals, independently of the pulse. Two scanning points are combined each time so as to obtain the ratio. Pulse-independent, continuous $SpO_2$ values are thus created. A further method in the time domain for interference suppression is described in EP-A-870465. Here the basic signals are reduced to their AC components through constant average value subtraction. Interferences superimposed in the same direction on both basic signals can be eliminated through subtraction of the AC components.

A complex adaptive filter is described in WO 96/12435 and operates in accordance with the principle of echo suppression, known from telephony. A filter is controlled such that an image of the interference component is generated, which is subsequently subtracted from the interfered signal.

Spectral analyses for artifact recognition were published in a research paper by Rusch et al. in "Signal Processing Method for Pulsoximetry", Comput. Biol. Med., vol. 26, no. 2, pp. 143–159, 1996, in which it is investigated whether it is possible to find the pulse frequency and amplitudes in a simpler manner in the frequency range. Several adjustments of the Fast Fourier transform (FFT) and the Discrete Cosine Transform (DCT) were compared. The algorithm proposed, however, has particular weaknesses in the suppression of movement artifacts.

Further methods of recognizing and suppressing artifacts are described in WO 97/00041, with the proposal to eliminate artifacts by simple mathematics, for which it is assumed that movement interferences lead to the same logarithmic changes in all wavelengths. In U.S. Pat. No. 5,588,429, the fractal dimension of the basic signals is determined, the fundamental idea being that the fractal dimension of a non-interfered signal is small, whereas that of an interfered signal is great. According to U.S. Pat. No. 5,355,882, only the instantaneous DC values are used within interfered intervals, whereas the AC values originate from moments before the interference.

Methods in the time-frequency domain for interference suppression with the use of so-called wavelet transforms are described inter alia in JP-A-10216096 (for living-body signals), U.S. Pat. No. 5,778,881 (for ECG applications), or EP-A-816863 (for radar applications).

U.S. Pat. No. 5,619,998 and U.S. Pat. No. 5,497,777 describe noise filter methods in the time-frequency domain for ultrasound imaging systems. The imaging signals are subdivided into overlapping sub-intervals of equal length. Each of the sub-intervals is transformed by means of a discrete wavelet technique. It is identified for each transformed sub-interval whether the wavelet transform coefficients relate to interferences or to the useful signal. The identification takes place here through the use of adaptive, non-linear threshold value formation. The wavelet coefficients which were selected as relating to the useful signal are retained, and those wavelets which were selected as belonging to interferences are erased. The remaining useful signal wavelet coefficients are transformed back in an inverse discrete wavelet transform.

Coifman et al. in "Experiments with Adapted Wavelet De-Noising for Medical Signals and Images", published by Metin Akay in "Time Frequency and Wavelets in Biomedical Signal Processing", IEEE, ISBN 0-7803-1147-7, 1997, pp. 323 ff., also describes an algorithm against interference in the time-frequency domain for medical signals and images. A one-dimensional signal such as, for example, a sound file, is subdivided into windows of a desired length. A wavelet packet transform with a number of filters is attempted in each window, the transform with the lowest entropy is retained as the best basis, and the coefficients are sorted in the order of falling amplitude. The coefficients having an amplitude smaller than a given energy threshold value are eliminated in each window, and a cost function for the coefficients (i.e. how many wavelet packet coefficients does it "cost" to achieve the energy for which all values >>0 are counted) is evaluated repeatedly until the cost is greater than a given cost threshold value. The coefficients not considered (too small) are erased, and a new signal is reconstructed from the remaining coefficients.

It was found to be particularly unfavorable in the two methods in the time-frequency domain mentioned last that the useful signal may also become modified and distorted in the case of an erroneous assignment of the wavelet coefficients. This is in particular useless in the case of major interferences superimposed on the useful signal.

Each of the cited methods has its weak points in one or several applications. It has been found to be impossible until now to find a method for the suppression of interference which is fully satisfactory for all applications.

SUMMARY OF THE INVENTION

It is accordingly an object of the present invention to provide a further method for suppressing interferences superimposed on measurement signals with a substantially periodic useful signal. This object is achieved by means of the characteristic features of the independent claims. Advantageous embodiments are defined in the dependent claims.

The starting point for the present invention is the model that interferences superimposed on measurement signals with a substantially periodic nature are mostly of a transient nature. This means that the desired useful signals can be regarded as (substantially) periodic, and the interference signals superimposed thereon as (substantially) aperiodic. To simplify the discussion and to make it more understandable, the following text will refer only to periodic and aperiodic signals, also if this could relate to substantially periodic or substantially aperiodic signals, i.e. signals which have a predominantly periodic or aperiodic character, as applicable.

Whereas the periodic signals can be well represented as a sum of periodic basic functions through a suitable transformation, and often only few summation coefficients are sufficient for representing them, the aperiodic signals can be well represented through a summation of aperiodic basic functions, only few summation coefficients often being sufficient again for this representation. Conversely, however, the representation of the periodic signals through summation of aperiodic basic functions requires a high expenditure and a plurality of summation coefficients so as to represent these periodic signals satisfactorily. In other words, a periodic useful signal is distributed over a plurality of coefficients for summation of aperiodic basic functions, while the aperiodic interferences are usually distributed over only few summation coefficients of aperiodic basic functions, but with a higher amplitude. In a transformation of the measured signal into a summation of aperiodic basic functions, accordingly, few coefficients will often suffice, which are then to be suitably manipulated so as to suppress the interference of a transient nature.

According to the invention, an interference suppression takes place through transformation of the measurement signal into a summation of aperiodic basic functions. When it is recognized on the basis of the obtained coefficients of the summation that it probably relates to an interference, these coefficients will be suitably manipulated, and the summation thus manipulated is transformed back again. If no manipulation of the coefficients has taken place, a corresponding back-transformation can be omitted, and the measurement signal can be directly used.

A preferred transform is the so-called wavelet transform as described in particular in Mallat S. G., "A Wavelet Tool of Signal Processing", Academic Press, San Diego, 1998, Wickerhauser M. V. "Adaptive Wavelet Analysis", Vieweg & Sohn, Braunschweig, 1996, or von Daubechies I., "Ten Lectures on Wavelets", CBMS, vol. 61, SIAM Press Philadelphia, PA, 1992. A further discussion of the known wavelet transform may be omitted here, as a reference to the above and further background literature will suffice.

A suitable criterion for recognizing coefficients which are likely to have been influenced by interference and which can be ascribed to aperiodic signals such as interferences (also referred to as interference coefficients) is formed in particular by the amplitude or energy of the coefficients. If, for example, the coefficient amplitude (quantity) or the coefficient energy exceeds a given threshold, limit, or expectation value, which was preferably derived from preceding, uninterfered measuring phases or otherwise, for example empirically, the relevant coefficients will be regarded as such (interference) coefficients as point to the presence of an aperiodic interference. The expected interference component can be suppressed through a suitable manipulation of the coefficient amplitude such as, for example, reducing the amplitude to or towards the above or a further limit value (possibly derived from the first), however, without at the same time suppressing the useful signal.

This coefficient manipulation according to the invention differs significantly in particular from the one described by Coifinan et al. (see above). Whereas according to the invention only those coefficients are manipulated which are greater than a threshold value, Coifinan et al. manipulate only those which are smaller than a threshold value. The method described by Coifihan can be satisfactorily applied to interference suppression of signals having a signal-to-noise ratio $S/N >> 1$. The interference suppression according to the invention, by contrast, is found to be highly advantageous in particular for very high interference components with $S/N << 1$.

It is thus possible for known periodic signals to suppress the interfering influence very strongly through the use of the coefficient manipulation according to the invention, given a knowledge of the useful signal. Since the measurement signal itself is always unknown in practice, however, and only a probable gradient can be assumed, care has definitely to be taken in the manipulation of the coefficients so as to keep an inadvertent elimination or inadvertent influencing of the useful signal small or to avoid it altogether. Overall, however, the coefficient manipulation according to the invention renders it possible, given a suitable choice and dimensioning of the decision criterion, to decide whether a "transient" coefficient is present (i.e. a coefficient which derives substantially from a transient interference—also called interference coefficient), so as to achieve an effective recognition and suppression of transient interferences with a suitable dimensioning of the correction of a recognized transient coefficient.

In a preferred embodiment, the decision criterion used for deciding whether a transient coefficient is present is an average value of the measurement signal. The average value is then preferably obtained through averaging of the measurement signal values over a time interval, which interval preferably extends some distance into the past. If the coefficient amplitude is greater than a given factor multiplied by the respective average value thus determined, this coefficient is regarded as a transient coefficient, and the amplitude is preferably reduced by a certain factor.

In another embodiment, the average value is obtained through averaging of the energy values of the measurement signal over a time interval, which interval extends some distance into the past. If the coefficient energy is greater than a given factor multiplied by the respective average value thus obtained, the respective coefficients are regarded as transient coefficients, and the amplitude is preferably reduced by a certain factor.

In a further embodiment, the decision criterion used for the recognition of transient coefficients is the "average" energy of the measurement signal, preferably as the sum of the squared wavelet coefficients or the sum of the squared scanning values of the time signal in the time window considered. This "average" energy is preferably determined such that a certain element is taken from the energy values (per wavelet band) of the preceding seconds (preferably 30 seconds) for each rank function. The rank function ($rank_\alpha$) determines from a series of m values the n-smallest value; the parameter $\alpha$ (value preferably between 0 and 1) here lays down the rule $n=\alpha \cdot m$. With a close to 0, an energy peak will arise which lies only little above the minimum. A favorable value for the application was found to be $\alpha=0.2$. In a preferred embodiment, a lower average energy threshold is then determined for each respective measurement value. When the coefficient energy is exceeded by a given factor multiplied by the respective lower average energy value, the trigger condition is fulfilled, and a manipulation of the excessive coefficient takes place.

The amplitude or energy gradient of the recorded measurement values up to the present moment is preferably taken for determining the decision criterion for recognizing a transient coefficient and/or for the manipulation of a recognized transient coefficient. Suitable wavelets were found to be in particular short wavelets such as, for example, Coiflet-2 or complex wavelets such as "Gabor-like" wavelets (reference is made in particular to: Kingsbury N., "A Complex Wavelet Transform with Perfect Reconstruction Using Low-Complexity Gabor-Like Filters", IEEE Sig. Proc. Letters, September 1997, in this connection).

For determining the transient coefficients to be suppressed, preferably, the coefficients are first quantitatively sorted for each frequency band and, starting with the greatest coefficients, the cumulative energy of the frequency band is determined. Starting with the greatest coefficients, those coefficients of the cumulative energy which exceed a reference level are manipulated until the total of the cumulative energy exceeds the reference level.

If several measurement signals from one source are present, they are preferably forcibly synchronized, i.e. if a measurement signal is manipulated, the other one is correspondingly manipulated.

The interference suppression according to the invention renders it possible to act with precision exclusively on interfered signal portions, while non-interfered signal portions are not affected.

The interference suppression according to the invention is preferably used for removing noise from medical measurement signals. The invention is found to be particularly effective for pulsating medical measurement signals such as those which occur in particular in pulsoximetry or blood pressure measurements. The interference suppression according to the invention renders possible a reliable recognition and suppression of exactly those movement artifacts which are particularly strong interfering factors in pulsoximetry, because these movement artifacts are characterized by steep flanks and high amplitudes. Nevertheless, the interference suppression according to the invention is not limited to medical applications, but it may be used for measurements or signal recordings of any kind wherever aperiodic interferences may be superimposed on a periodic signal.

SHORT DESCRIPTION OF THE FIGURES

The invention will be explained in more detail below with reference to the drawing, in which identical or functionally identical or similar items have been given the same reference symbols.

FIGS. 3A to 3C show a further example of an input signal in the time domain (FIG. 3A), in the frequency domain (FIG. 3B), and in the phase domain representation (FIG. 3C);

DETAILED DESCRIPTION OF THE DRAWINGS

Figure 1A:
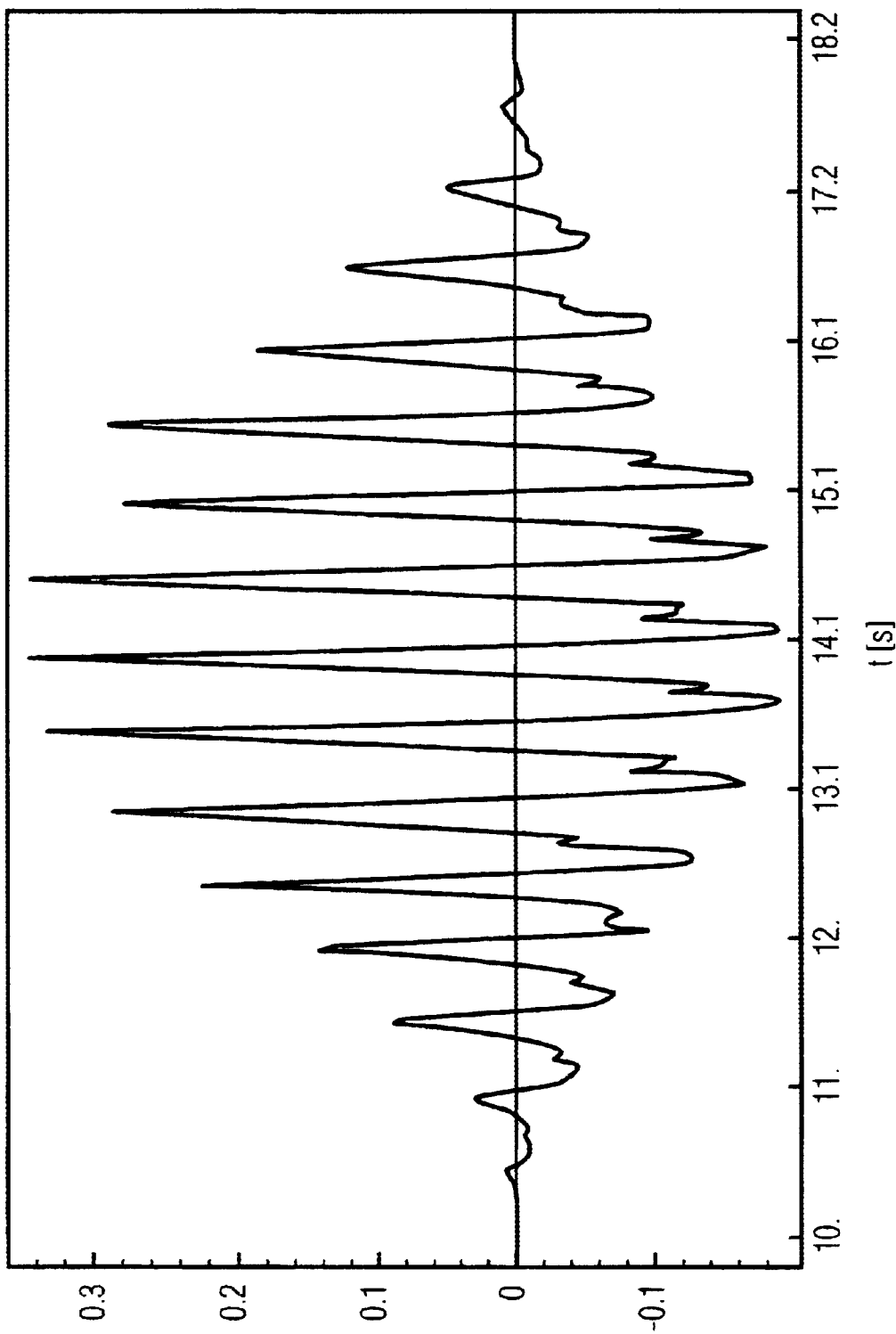
FIGS. 1A to 1C show a typical standard signal without interference in the time domain (FIG. 1A), in the phase domain representation (FIG. 1B), and in a coefficient representation.

An example of a preferred application of an interference suppression according to the invention in the determination of the oxygen saturation will be discussed below. Since the determination of the oxygen saturation is a process which is sufficiently known, it will not be explained in any detail here, because detailed information can be found in particular in the background literature cited above.

The interference suppression according to the invention is preferably applied to the signal processing of the obtained basic signals. Nevertheless, the interference suppression according to the invention may also be used in other stages, alternatively or additionally, for suppressing interference superimposed on signals occurring in the time domain such as, for example, after the determination of the oxygen saturation value.

For the purpose of the interference suppression according to the invention, the signals to be filtered are first subdivided into short time spans (also called windows), and each signal portion is reduced to coefficients on the basis of suitable wavelets. These wavelet coefficients are then manipulated with the object in particular to suppress frequency and time ranges which contain artifacts. If such a wavelet coefficient manipulation was carried out, the back-transformation into the time domain is subsequently carried out with these modified wavelet coefficients. If no coefficient manipulation was carried out, the back-transformation can be omitted, and the input signals can be directly utilized for further processing.

First, a standard signal without interference and a pure artifact signal will be shown with the manner in which they can be transformed into wavelet coefficients. For the discrete wavelet transform, the frequency domain is subdivided into dyadic intervals (($f_s$... $f_s/2)/2^j$) for j=1, ..., J. A fourfold subdivision (J=4) and a scanning frequency of $f_s$=31.25 Hz result in five frequency bands:

band 1: 15.63-7.91 Hz
band 2: 7.81-3.90 Hz
band 3: 3.90-1.95 Hz
band 4: 1.95-0.98 Hz
band 5: 0.98-0 Hz.

The lowest-frequency band (band 5 in this case) is usually denoted the "trend", because the trend of the signal can be recognized from this band.

Figure 1B:
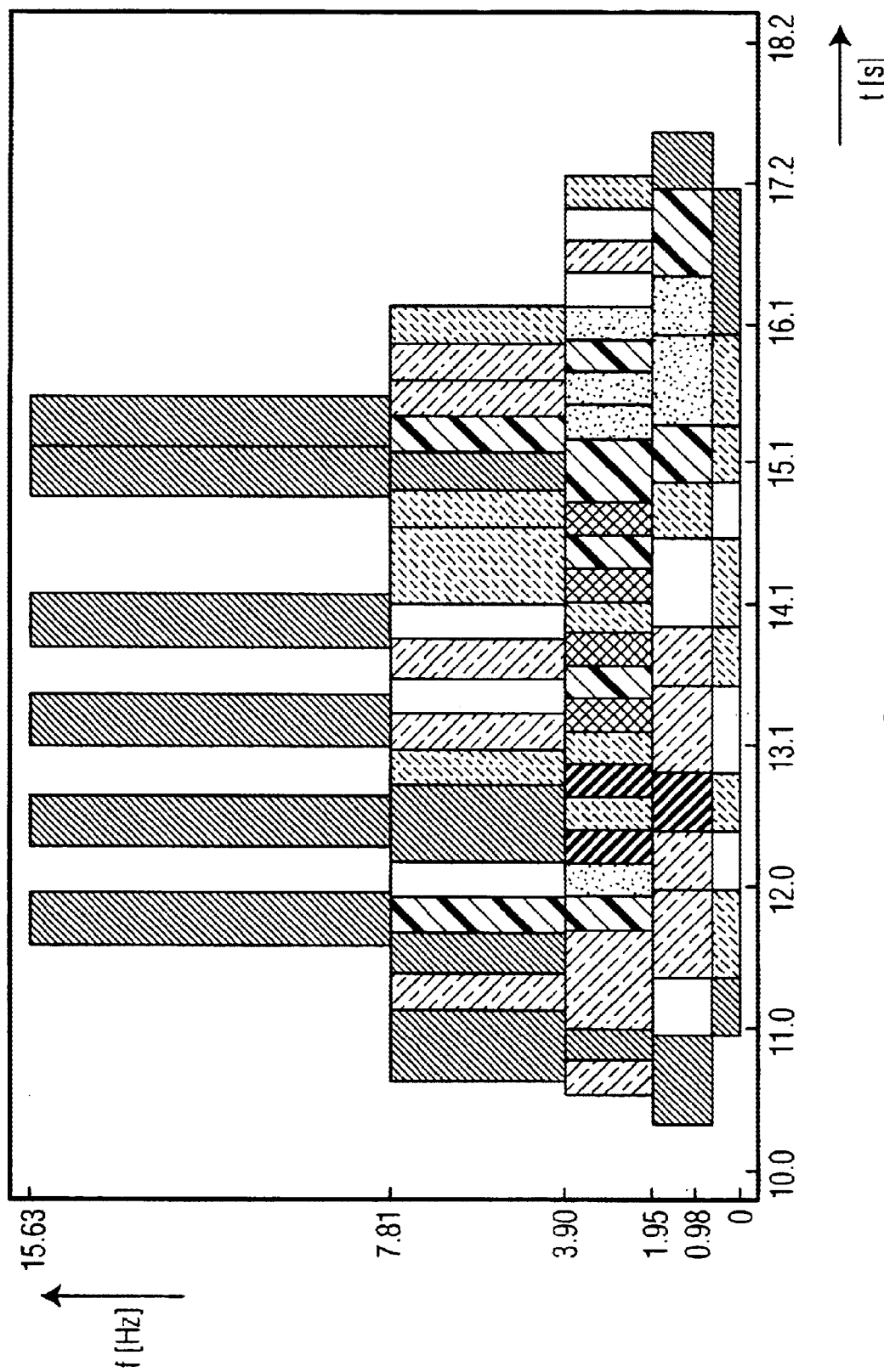
Figure 1C:
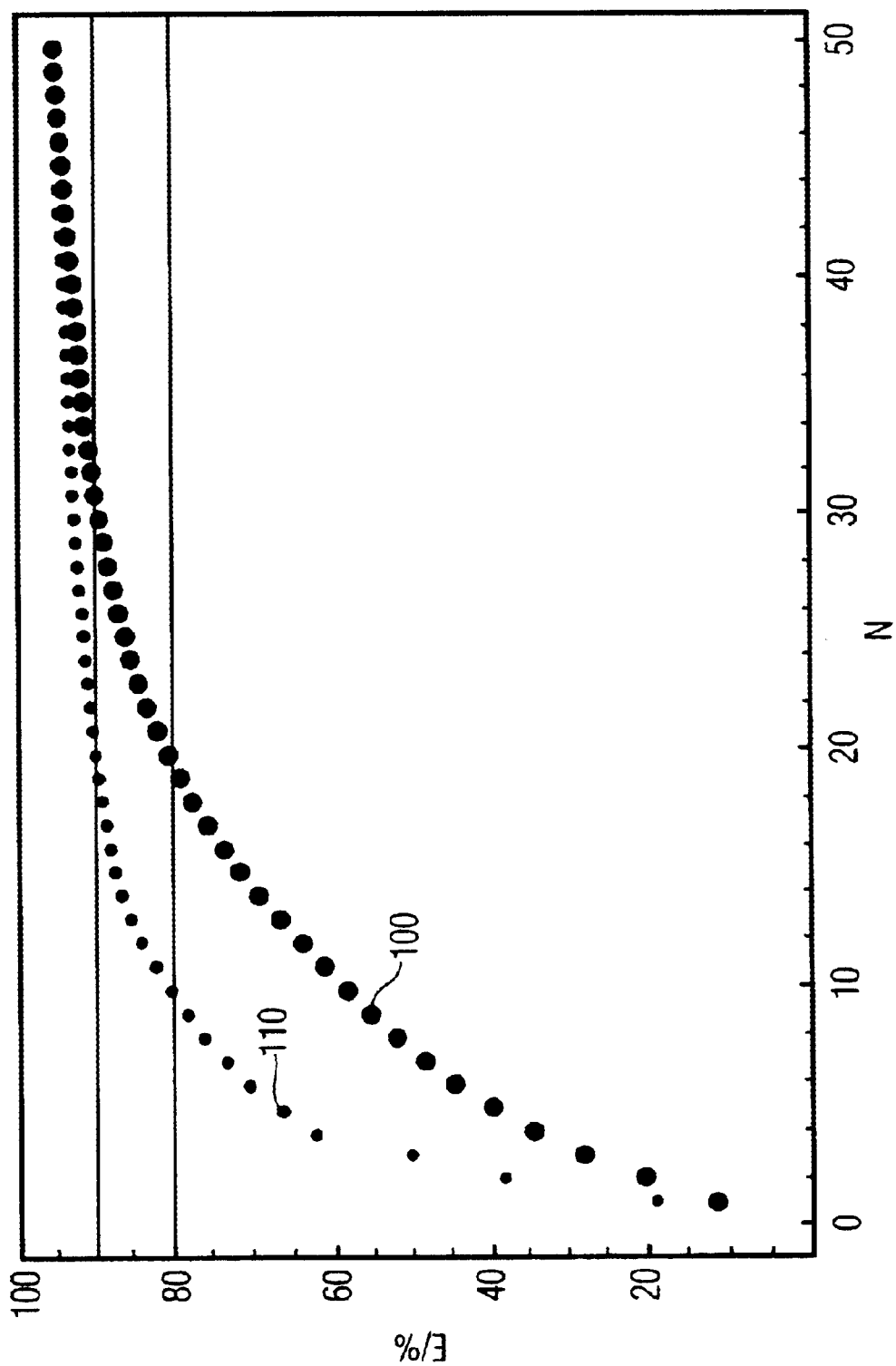

FIG. 1A shows a typical standard signal without interference which was (optionally) already modulated with a so-called Hanning window. FIG. 1B is a representation of the standard signal of FIG. 1A in a phase domain representation after a wavelet transform with a Coiflet-6 filter has taken place. FIG. 1C shows the cumulative energy proportion E per coefficient in percents of the total signal after sorting as to quantity over the number N of the coefficients. A gradient 100 shows the coefficients in accordance with the wavelet transform carried out in FIG. 1B. A gradient 110, by contrast, represents the coefficients of a Fourier transform of the standard signal shown in FIG. 1A.

As can be clearly seen in FIG. 1C, the periodic standard signal of FIG. 1A can be represented for 80% with 10 Fourier coefficients already, whereas almost 20 coefficients are necessary for representing the signal for 80% by means of the wavelet transform.

Figure 2A:
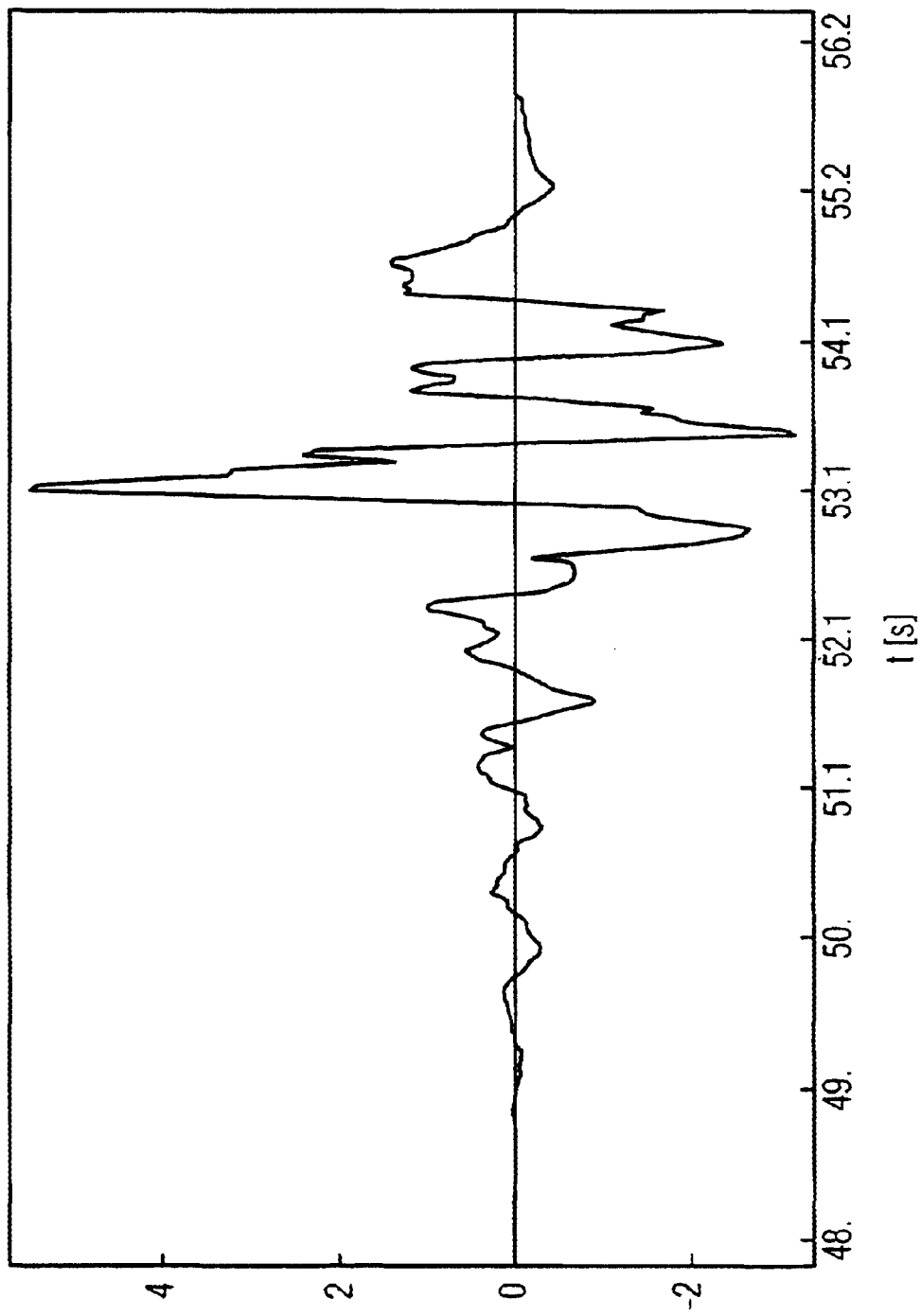
FIGS. 2A to 2C show a typical movement artifact in the time domain (FIG. 1A), in the phase domain representation (FIG. 1B), and in a coefficient representation.
Figure 2B:
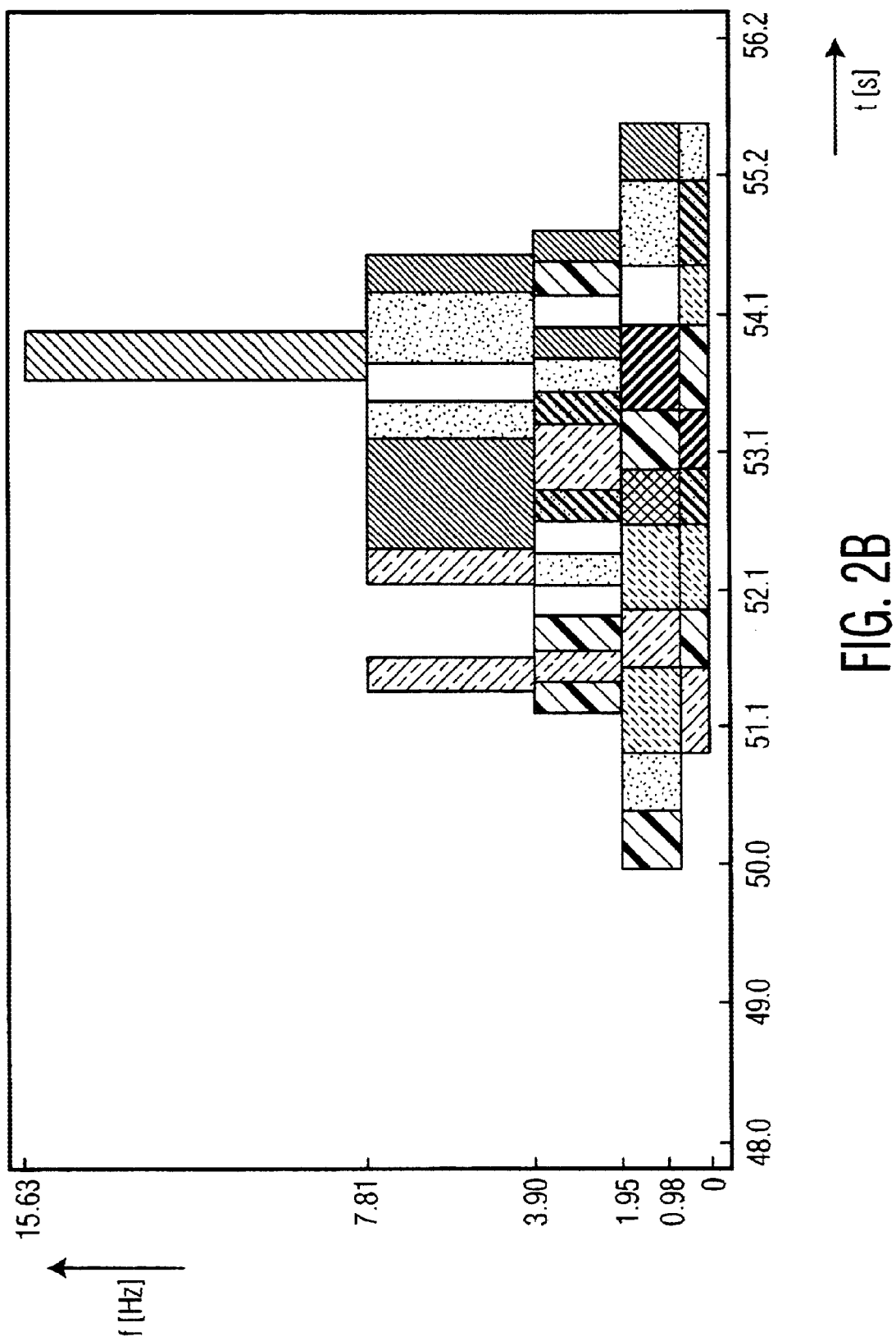
Figure 2C:
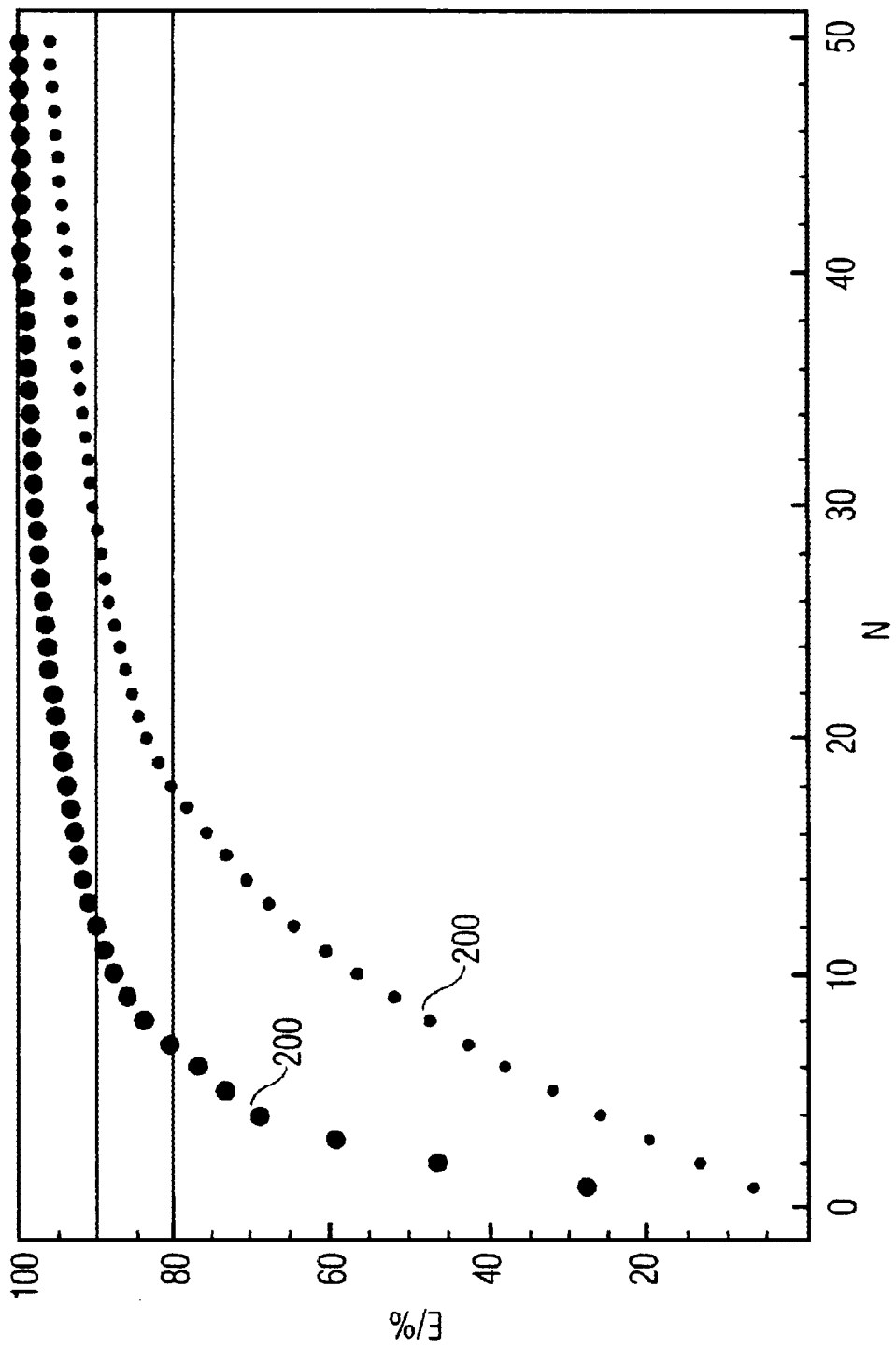

FIG. 2A shows a typical movement artifact, also modulated with a Hanning window. FIG. 2B shows the phase domain representation of the interference of FIG. 2A after a wavelet transform with a Coiflet-6 filter has taken place. Similar to FIG. 1C, FIG. 2C shows the cumulative energy proportion per coefficient in percents of the total signal after sorting as to quantity, wherein a gradient 200 represents the coefficients of the wavelet transform and a gradient 210 the coefficients of a corresponding Fourier transform. While now 7 wavelet transform coefficients are sufficient for representing the interference for 80%, 17 Fourier transform coefficients would be required for this purpose. This demonstrates that interferences such as movement artifacts can be expressed very effectively by the wavelet transform, whereas the windowed Fourier transform requires considerably more coefficients for achieving the same energy level.

Assuming that an interference is represented most strongly in the greatest wavelet coefficients, coefficients exceeding a certain value are reset to zero or are reduced more or less strongly.

Since it is not known a priori whether interference are present and, if so, how high they are, a criterion is to be sought for deciding when the wavelet interference suppression is to be activated. Monitoring of the signal energy and of the energy fluctuations has gradually been found to be favorable for this. If the fluctuations are high, and the energy exceeds a level clearly above that of the recent past, the coefficient manipulation according to the invention is activated. This method substantially comprises the following steps:

1. Carrying out a wavelet transform over a time window of given length, preferably an 8 s window.
2. Determining an energy gradient $e_j(t)$ in time for each wavelet frequency band j as a trend in time.
3. Deriving a reference level $S_j(t)$ from $e_j(t)$ for each frequency band.
4. Determining a cumulative energy for each frequency band, i.e. sorting the wavelet coefficients as to quantity (for the $SpO_2$ basic signals RED and INFRARED).
5. Scanning the cumulative energy starting from the top until the level has reached a reference level $\rho_j = r \cdot S_j$. As a result, $n_j$ coefficients are present (for RED and INFRARED) for each frequency band j for the purpose of suppression.
6. Forced synchronization of the coefficients of RED and INFRARED to be suppressed, i.e. if a certain time-frequency atom in RED is to be suppressed, it is obligatory also to suppress that same atom for INFRARED, and vice versa. This avoids excessive $SpO_2$ distortions in cases with interference at one side.
7. Determining an average amplitude level $\epsilon_j$ of the coefficients of the frequency band from the remaining smaller coefficients which were not manipulated.
8. Shrinking of the coefficients to be suppressed, each coefficient being reduced to a level $s \cdot \epsilon_j$ in accordance with its sign. This means a reset to zero for a factor s=0.
9. Transforming the manipulated and non-manipulated wavelet coefficients back into a time signal.

FIG. 3A shows a further example of an input signal, with a gradient 300 (thin line) representing the non-interfered basic signal and a gradient 310 (bold line) the interfered signal. Furthermore, a gradient 320 (semi-bold line) shows the signal after interference suppression according to the invention, resulting from the gradient 310 when the preferred embodiment described here has been carried out.

Figure 3B:
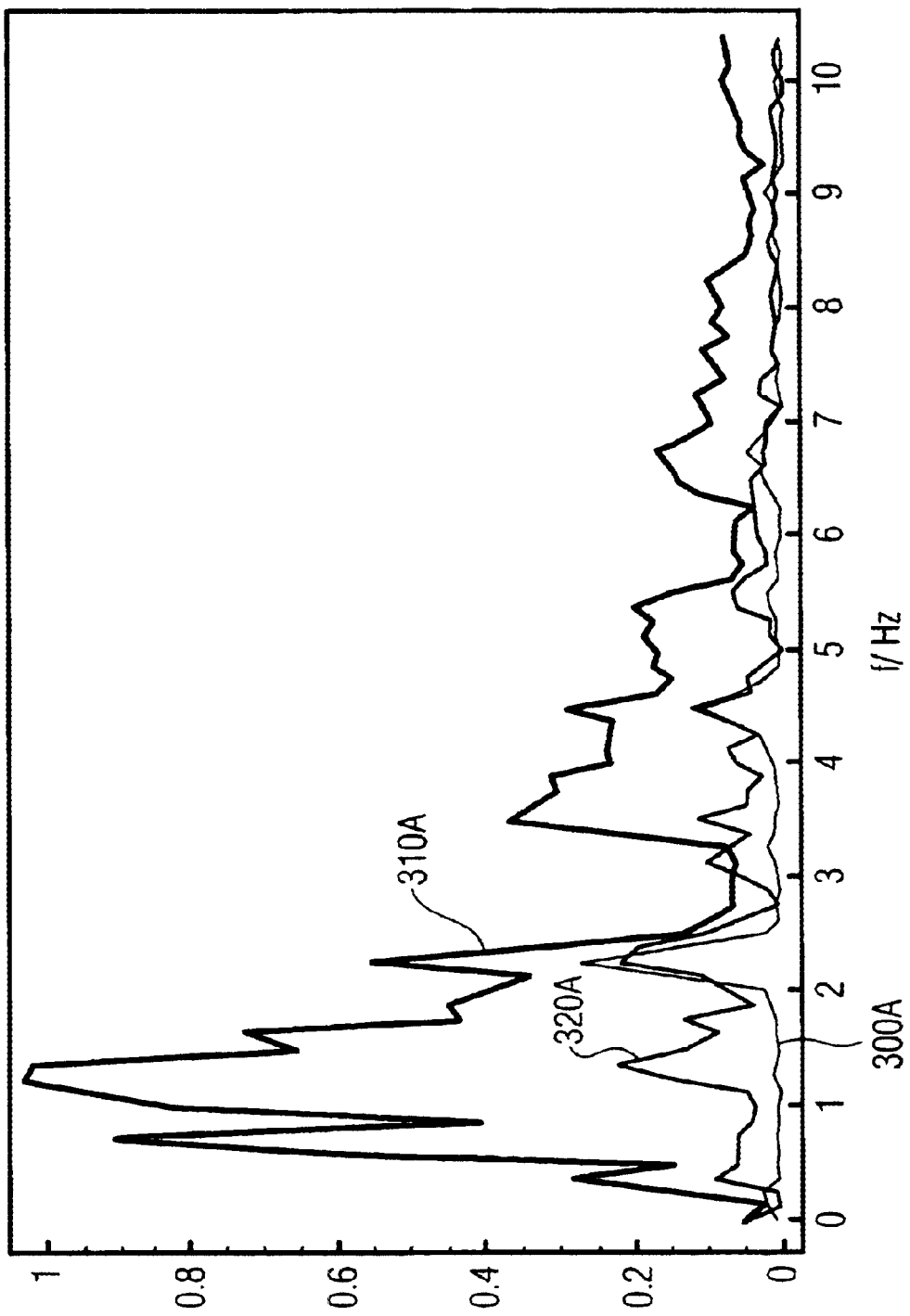

FIG. 3B shows the signal episode of FIG. 3A in the frequency domain, with a gradient 300A (thin line) being the non-interfered signal, a gradient 310A (bold line) the interfered signal, and the gradient 320 (semi-bold line) the signal after interference suppression according to the invention. The frequency f in Hz is plotted on the ordinate, and the amplitude on the abscissa.

It is particularly in the time domain (cf. FIG. 3A) that the effect of the interference suppression according to the invention is strongly apparent: the major transient 330 has disappeared almost completely. In the frequency domain (cf. FIG. 3B), however, the hidden useful lines are also separated from the surrounding interference components.

Figure 3C:
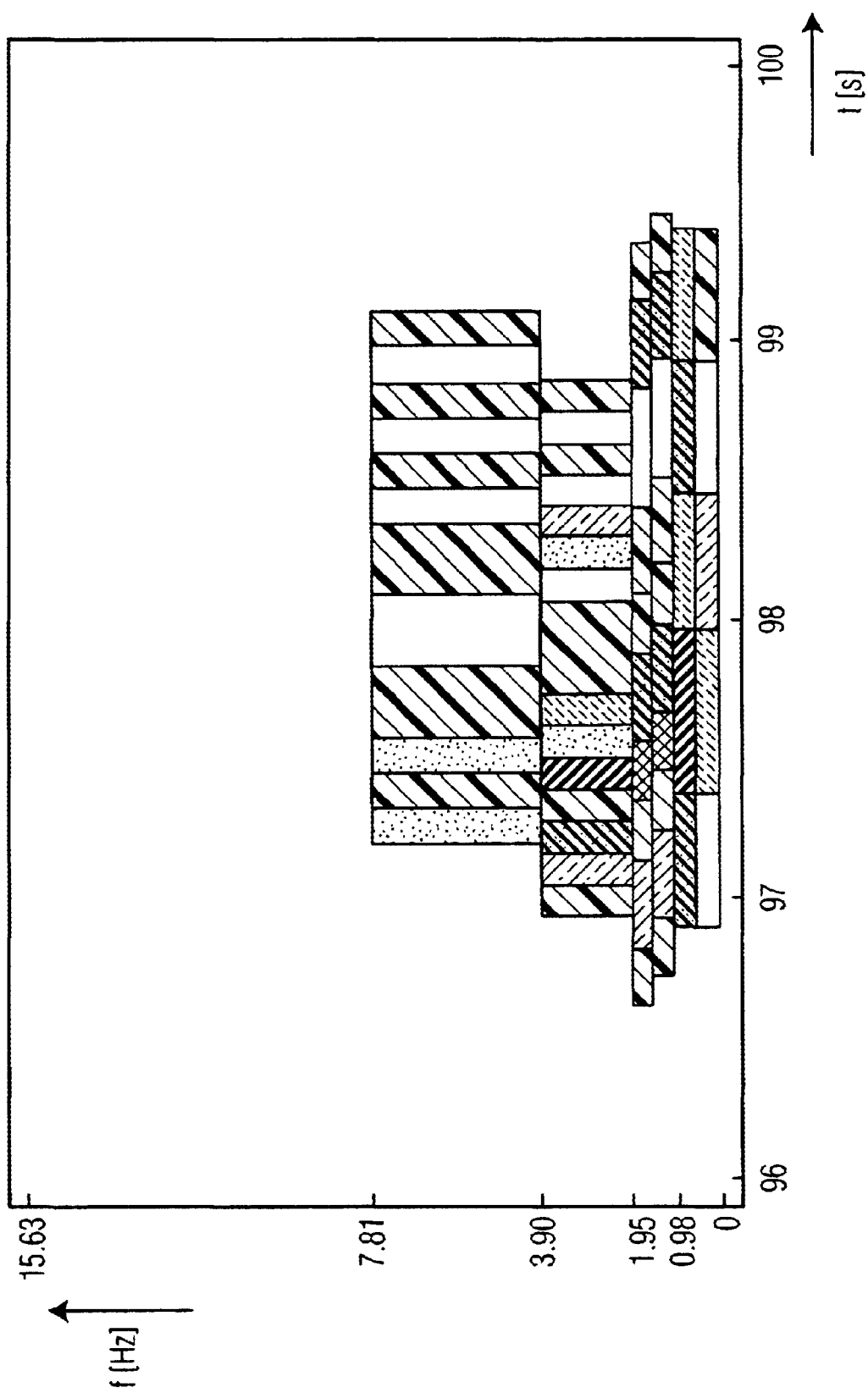
Figure 3D:
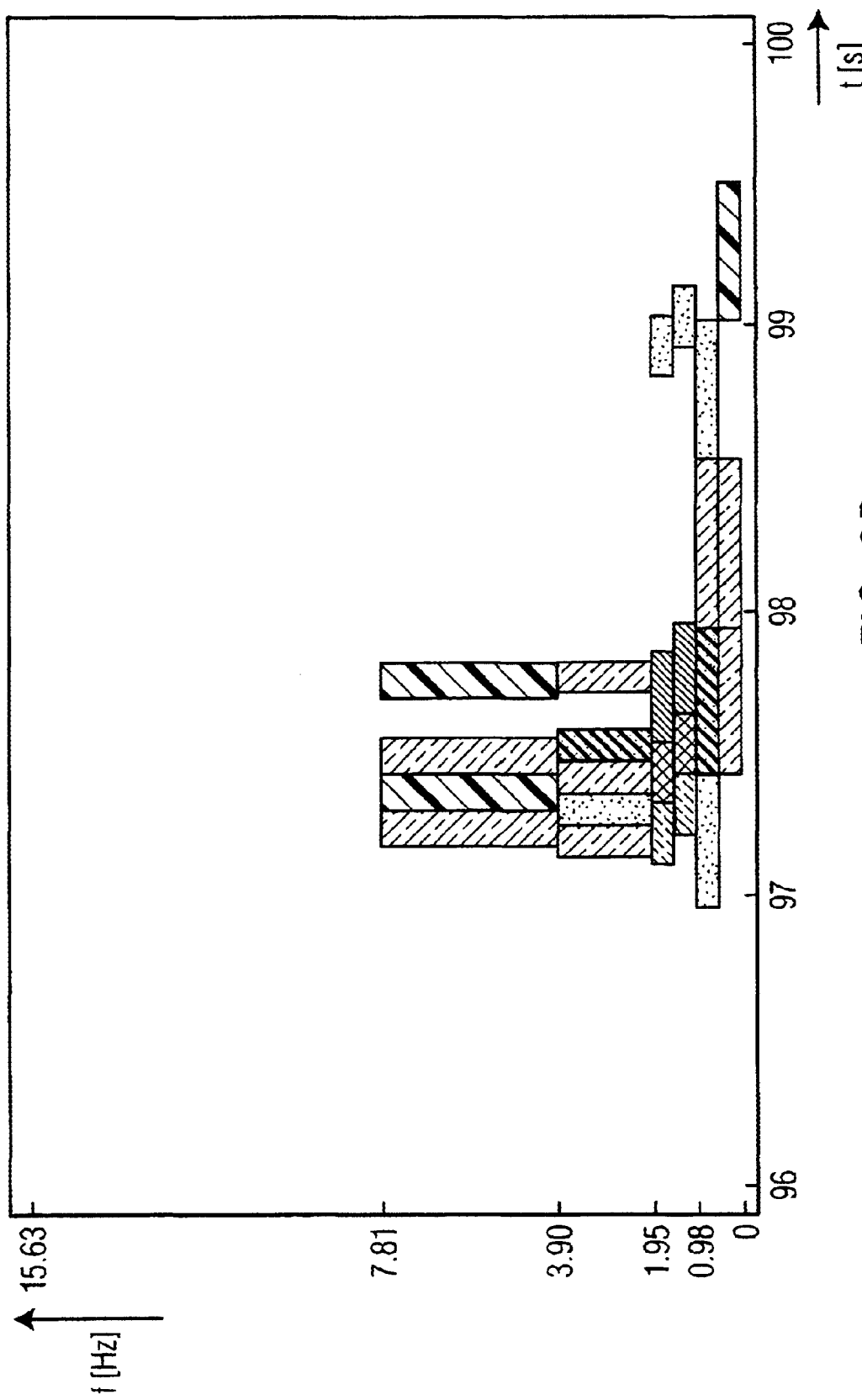
FIG. 3D shows the coefficients to be suppressed from the example of FIG. 3A.
Figure 3E:
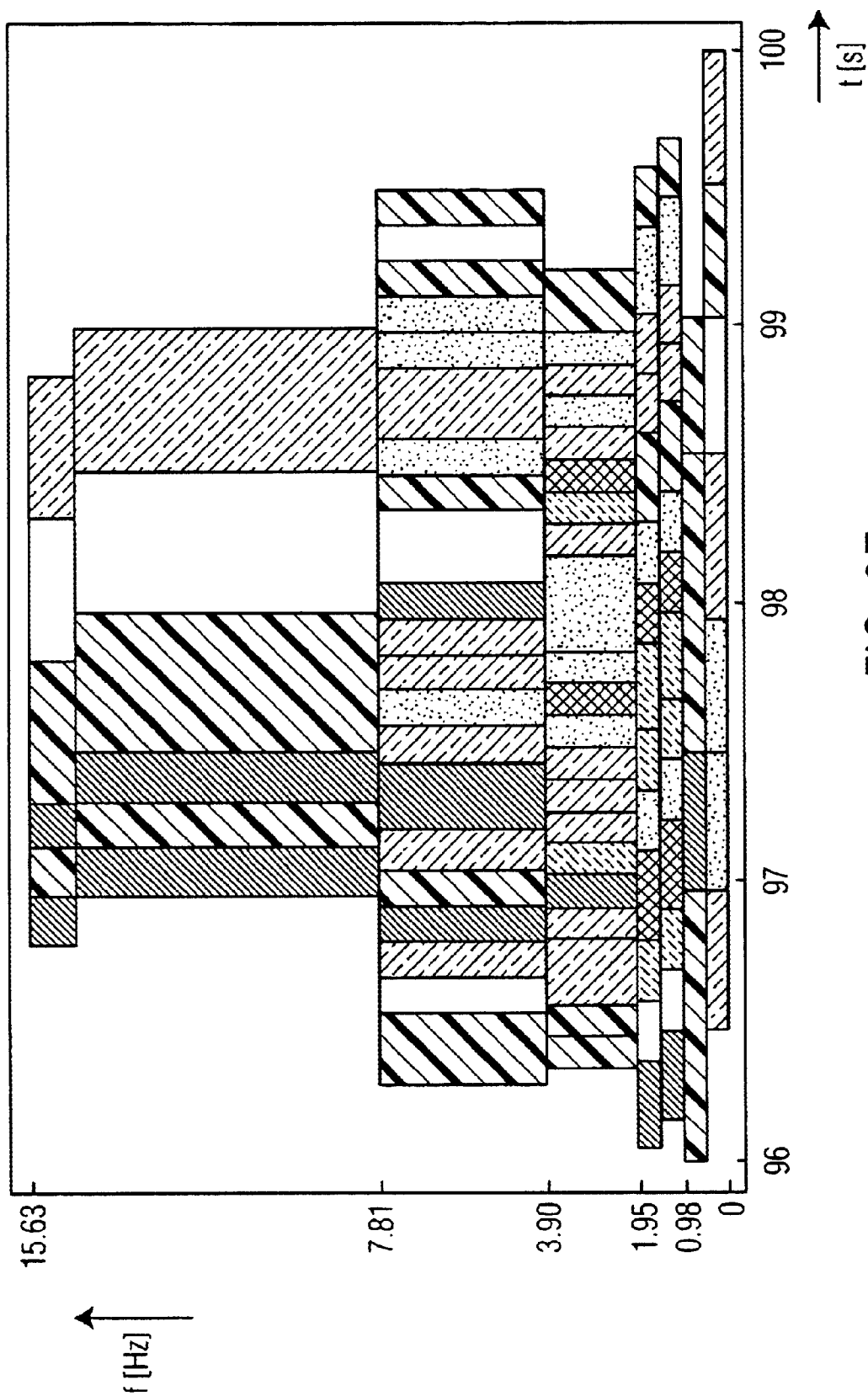
FIG. 3E shows the signal freed from interference based on the example of FIG. 3A.

FIG. 3C clarifies the manipulation of the wavelet coefficients in graphic form as a phase domain representation corresponding to the signal portion of FIG. 3A. Within the interfered output signal (FIG. 3C), the coefficients to be suppressed are identified (FIG. 3D), and the signal without interference results therefrom (FIG. 3E). It should be noted about the representation chosen that a few coefficients are only seemingly raised (instead of suppressed), because the grey tone representation chosen here automatically standardizes itself to the highest coefficients.

The reduction level is preferably determined individually for each frequency band j and for each color (RED and INFRARED) from the wavelet coefficients $z_q^{(j)}$ which are not to be suppressed. This leaves the q smallest coefficients, from which the average value:

$$\varepsilon_j = \frac{\sum\limits_q Abs(z_q^{(j)})}{\frac{q}{N}\sum\limits_{i=1}^{N} w_i}$$

is calculated, in which $w_i$ is the FFT window function over the length N.

Each coefficient to be manipulated is determined from:

$$Z_{new}^{(j)} = S \bullet \omega_i \bullet Sign(Z_{old})^{(j)} \bullet \varepsilon_j$$

The coefficient sign is retained, but the level is adapted to the average level (multiplied by a trimming factor s).

Since movement artifacts are mostly of a transient nature, this means that there will regularly be a sudden rise or a strong variability in the signal energy. Therefore, two criteria are to be derived from the energy trend, together supplying a trigger for an interference suppression: 1. energy threshold, and 2. energy fluctuation.

The energy $e_j(t)$ is preferably newly calculated in the wavelet domain separately for each scale j) from the coefficients $z_i^{(j)}$ from second to second:

$$e_j(t) = \sum_{i=t-N/2^j}^{t} z_i^{(j)2}$$

Apart from the trend, a fluctuation $F_j(t)$ of the energy $e_j(t)$ is determined, preferably from (on a logarithmic scale):

$$F_j(t) = \log_2 \frac{e_j(t)}{e_j(t-1)}$$

A threshold function $S_j(t)$ is formed from the energy trend $e_j(t)$ by means of a rank function rank$\alpha$ (see above). The energy trend on which this is based extends suitably over a certain time period (preferably up to a maximum of 60 seconds) back into the past so as to allow a natural growth of the useful signal energy without causing a triggering mechanism.

The trigger for interference suppression is not generated until:

1. the energy fluctuation $F_j(t)$ has exceeded a value of preferably 0.5, and
2. the energy $e_j(t)$ exceeds the threshold function $S_j(t)$ by a factor p (p >1) within (preferably) 5 seconds after that.

The interference suppression is preferably switched off the moment the energy has dropped to $e_j(t) < p \cdot S_j(t)$ again.

After triggering has taken place, the coefficients are sorted as to their quantitative values. Starting with the greatest coefficients, the energy of each coefficient is taken out until an energy level $R_j = r \cdot S_j(t)$ has been reached. A reference energy factor r renders it possible to indicate how deeply the interference suppression should take place, independently of the trigger threshold.

Figure 4:
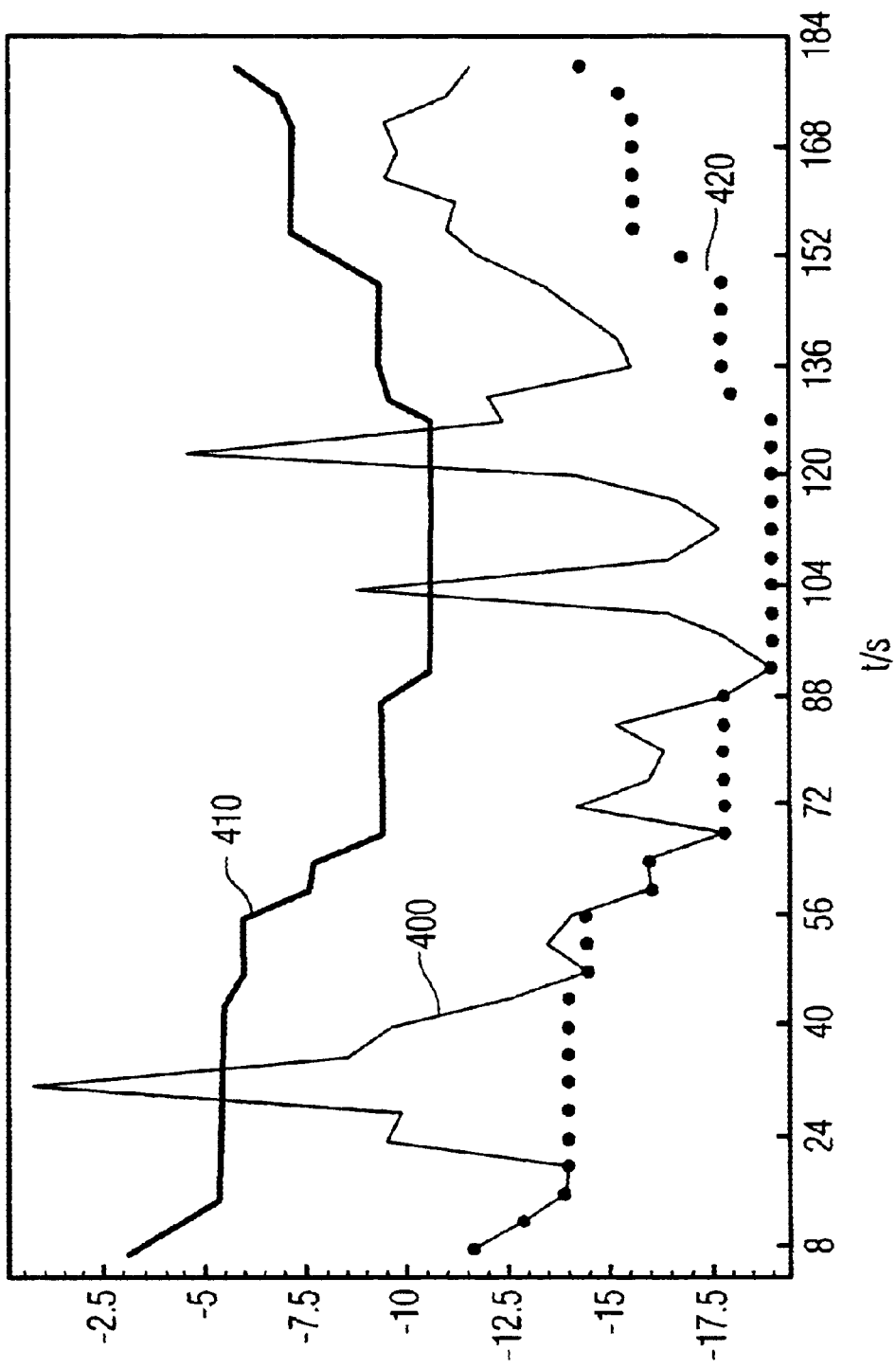
FIG. 4 shows an energy gradient of an interfered episode and the threshold value function derived therefrom.

FIG. 4 shows an energy gradient of an interfered episode and the threshold value function derived therefrom, for example for the frequency band j=4, for a fivefold wavelet transform with a Coiflet-2. The energy scale was plotted on the abscissa in decibels so as to indicate the strong dynamics better. The thin line (400) shows the energy gradient, the bold line (410) the trigger level $p \cdot S_j$, and the dotted line (420) the threshold value function $S_j$ for rank functions with $\alpha = 0$.

The introduction of the energy fluctuation F was found to be particularly advantageous for the purpose of not triggering an interference suppression in the case of a signal with a strong amplitude variation, but without interference, since otherwise the result would be an incorrect weakening of the signal, which will usually lead to an $SpO_2$ error. Investigations have shown that the energy levels in the frequency bands fluctuate on average no more than by F(t)=0.19 in the case of episodes without interference, whereas in the case of interferences F(t)=0.40. The value of 0.5 is practically not exceeded in the case of standard signals at the moment, so that it would seem to be a suitable identification threshold for interferences.

As was noted above, this triggering takes place preferably independently for all scales. The red and infrared channels are also tested independently of one another. It was found, however, that it is better to synchronize these triggerings between the channels. The coefficients of both channels are reduced also if only one of the coefficients triggers the interference suppression. The coefficient positions shown in the example of FIGS. 3C to 3E are valid for both colors; the degree of reduction, however, will usually be different. This forced synchronization prevents a false ratio from arising when one channel lies above the trigger threshold level, but the other one remains just below it. If reduction should take place at an average level of the non-interfered coefficient, this will hardly be a disadvantage, because the forcedly manipulated coefficient will hardly undergo an amplitude change anyway if it is without interference.

Overall, the choice of the interference suppression parameters must be carefully weighed. Because of the strongly non-linear operation, a too strong interference suppression will lead to additional interferences and thus to errors instead of eliminating them. A too weak interference suppression renders the method ineffective. The following example of parameters was found to be a favorable parameter set.

| parameter | value |
| --- | --- |
| FFT window before interference suppression | yes |
| wavelet | COIFLET-2 |
| trigger factor p above threshold $S_t$ | 7 |
| energy difference (trigger threshold) | F > 0.5 |
| reference energy factor r with respect to threshold S(t) | 1 |
| reduction factor s | 0 |
| rank function parameter $\alpha$ | 0.2 |
| trend depth for rank function for determining S(t) | 30 s |

What is claimed is:

1. A method of suppressing interferences in a physical measurement signal with a substantially periodic useful signal, comprising the steps of:
   (a) transforming, preferably by means of a wavelet transform, the measurement signal into a summation of aperiodic basic functions, each member of the sum comprising a coefficient;
   (b) characterizing those coefficients which exceed a given threshold value as interference coefficients which have presumably been influenced by interference;
   (c) manipulating the interference coefficients for suppressing the interferences; and
   (d) transforming the summation manipulated in step (c) back into a measurement signal with interference suppression.

2. A method as claimed in claim 1, wherein the step (d) is only carried out if at least one coefficient was manipulated, and wherein otherwise the measurement signal is retained unchanged.

3. A method as claimed in claim 1, wherein the measurement signal is subdivided into time windows, and the steps are carried out for each time window.

4. A method as claimed in claim 1, wherein an average energy of the measurement signal, preferably in the form of the sum of the squared coefficients or the sum of the squared scanning values of the time signal in the time window considered, is used as the decision criterion as to whether an interference coefficient is present, which average energy is preferably determined such that a given element is taken from the energy values in a time interval in the past in accordance with a rank function.

5. A method as claimed in claim 4, wherein a lower threshold for the average energy is determined for each measurement value.

6. A method as claimed in claim 1, wherein in step (b) those coefficients whose amplitude and/or energy exceed(s) a given limit value, expected value, and/or threshold value for the respective coefficient are characterized as interference coefficients.

7. A method as claimed in claim 1, wherein the threshold value in step (b) is determined from preceding measurements of non-interfered useful signals or from energy trends.

8. A method as claimed in claim 1, wherein the frequency domain is subdivided into intervals, and the method is carried out separately for each frequency band resulting therefrom.

9. A method as claimed in claim 1, wherein the decision criterion used for deciding whether an interference coefficient is present is an average value of the measurement signal, which average value is preferably obtained through averaging of the measurement signal and/or the energy of the measurement signal over a time interval, and wherein, if a coefficient characteristic is greater than a given factor multiplied by the respective determined average value, said coefficient is regarded as an interference coefficient, whereupon said coefficient characteristic is reduced, preferably by a given factor.

10. A method as claimed in claim 1, wherein the manipulation in step (c) is carried out through a reduction of the amplitude to or towards a further threshold value for the respective coefficient.

11. A method as claimed in claim 1, wherein the measurement signal is a medical measurement signal, in particular a pulsatory measurement signal such as in pulsoximetry of blood pressure measurement.

12. A computer program, preferably a computer program product stored on a computer-readable storage medium, comprising a code for implementing the steps as claimed in claim 1, in particular if said program is implemented on a computer.

13. A device for suppressing interference in a physical measurement signal with a substantially periodic useful signal, comprising:

means for transforming, preferably by means of a wavelet transform, the measurement signal into a summation of aperiodic basic functions, each member of the summation having a coefficient, means for characterizing those coefficients which exceed a given threshold value as interference coefficients which have presumably been influenced by interference, means for manipulating the interference coefficients so as to suppress the interference, and means for transforming the manipulated summation back into an interference-suppressed measurement signal.

14. An apparatus for determining the oxygen content of blood by pulsoximetry, comprising device for suppressing interference in a measurement signal as claimed in claim 13.

* * * * *